(12) United States Patent
Glagolev et al.

(10) Patent No.: US 8,879,718 B2
(45) Date of Patent: Nov. 4, 2014

(54) DISTRIBUTED EVENT DELIVERY

(71) Applicant: Genesys Telecommunications Laboratories, Inc., Daly City, CA (US)

(72) Inventors: Anatoliy Glagolev, San Francisco, CA (US); Alexander Tikin, Pleasant Hill, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 13/844,099

(22) Filed: Mar. 15, 2013

(65) Prior Publication Data

US 2014/0153710 A1 Jun. 5, 2014

Related U.S. Application Data

(60) Provisional application No. 61/733,408, filed on Dec. 4, 2012.

(51) Int. Cl.

| | | |
|---|---|---|
| *H04M 3/00* | (2006.01) | |
| *G06F 17/27* | (2006.01) | |
| *H04M 3/523* | (2006.01) | |
| *G06Q 10/06* | (2012.01) | |
| *H04M 3/42* | (2006.01) | |
| *H04L 12/24* | (2006.01) | |

(52) U.S. Cl.
CPC ....... *H04M 3/42306* (2013.01); *G06F 17/2705* (2013.01); *H04M 3/5232* (2013.01); *G06Q 10/063114* (2013.01); *H04L 41/04* (2013.01)
USPC ............. 379/266.01; 379/265.01; 379/265.02

(58) Field of Classification Search
CPC .............. H04M 3/523; H04M 3/5232; H04M 2203/2011; H04M 3/5166; H04M 3/5238; H04M 3/5175; H04M 3/51; H04M 3/5191; H04M 3/5183
USPC ........................... 379/265.01–265.02, 266.01
See application file for complete search history.

(56) References Cited

U.S. PATENT DOCUMENTS

| | | |
|---|---|---|
| 5,937,051 A | 8/1999 | Hurd et al. |
| 6,363,411 B1 | 3/2002 | Dugan et al. |
| 6,449,356 B1 * | 9/2002 | Dezonno .................. 379/265.01 |
| 6,704,406 B1 | 3/2004 | Pearce et al. |
| 7,389,510 B2 | 6/2008 | Forrester |

(Continued)

OTHER PUBLICATIONS

Karger et al., "Consistent Hashing and Random Trees: Distributed Caching Protocols for Relieving Hot Spots on the World Wide Web*," 10 pages.

(Continued)

*Primary Examiner* — Rasha Al Aubaidi
(74) *Attorney, Agent, or Firm* — Christie, Parker & Hale, LLP

(57) ABSTRACT

A distributed method of delivering events to agent devices. A first software module generates an event, e.g., a screen pop event or a ringing event, for delivery to a second module responsible for an agent device. A third module, which may be the same module as the first module, evaluates a hash function to determine an identifier for the second module from an identifier for the agent device. The first module delivers the event to the second module, which responds to the event, e.g., by causing an agent device to generate a ringing alert or to display a screen pop.

20 Claims, 16 Drawing Sheets

(56) References Cited

U.S. PATENT DOCUMENTS

| | | |
|---|---|---|
| 7,701,925 B1 | 4/2010 | Mason et al. |
| 2002/0110113 A1 | 8/2002 | Wengrovitz |
| 2003/0123632 A1 | 7/2003 | Smith |
| 2003/0161462 A1 | 8/2003 | Stumer et al. |
| 2008/0115144 A1 | 5/2008 | Tsao |
| 2011/0167146 A1 | 7/2011 | Murray et al. |
| 2011/0179134 A1 | 7/2011 | Mayo et al. |
| 2012/0203864 A1 | 8/2012 | Tó et al. |
| 2014/0153707 A1 | 6/2014 | Rais et al. |
| 2014/0156330 A1 | 6/2014 | Rais et al. |
| 2014/0156682 A1 | 6/2014 | Kolesov et al. |
| 2014/0156789 A1 | 6/2014 | Kolesov et al. |

OTHER PUBLICATIONS

White, "Consistent Hashing," http://www.tom-e-white.com/2007/11/consistent-hashing.html, Feb. 6, 2014, 11 pages.

International Search Report and Written Opinion for International Application No. PCT/US2013/073196; mailed Mar. 4, 2014, 19 pages.

* cited by examiner

DISTRIBUTED EVENT DELIVERY

CROSS-REFERENCE TO RELATED APPLICATION(S)

The present application claims the benefit of Provisional Application No. 61/733,408, filed Dec. 4, 2012, entitled "SIP CLUSTER", the entire content of which is incorporated herein by reference.

FIELD

This disclosure generally relates to software systems used in contact centers and other enterprise communications systems, and more particularly to a modular, scalable, high availability system for handling session initiation protocol (SIP) communications in a contact center.

BACKGROUND

Contact centers may be used by an organization to communicate in an efficient and systematic manner with outside parties. Such centers may for example have large numbers of agents staffing telephones, and interacting with outside parties and with each other. Calls may be placed on hold or into an interactive voice response (IVR) system when first connected to the contact center; subsequently an agent may take a call, place it back on hold, transfer the call, conference in another agent, or take other such actions related to the call. Outside parties may also interact with a contact center by other mechanisms, including initiating contact through on-line chat, video, email, and the like.

The session initiation protocol (SIP) standard may be used in a contact center to conduct communications over an Internet Protocol (IP) network, which may operate within the contact center, and which may connect to outside networks such as the public switched telephone network (PSTN) through one or more gateways. An IP network may also extend outside of the contact center, enabling, for example, communications with parties connected to the Internet without the need to use the PSTN.

It may in some situations be advantageous to construct large contact centers, in which, for example, thousands of agents are employed. A large contact center may be helpful, for example, to an enterprise with a central contact telephone number from which each incoming call is dispatched to an agent according to the reason for the call, to an enterprise where it is often necessary to forward a call from one agent to another, or to an enterprise in which many agents work from different geographical locations. In such cases, it may be inefficient to construct multiple small independent call centers.

It may be advantageous for the software and hardware employed in a large contact center to be modular, scalable, readily expanded or reduced in size, and suitable for providing high availability service. Scalability may be important because performance-limiting bottlenecks may pose increasingly difficult challenges as contact center deployments become very large.

SUMMARY

According to one aspect, a system for delivering events to agent devices in a contact center is provided.

According to an embodiment of the present invention there is provided a method for distributed event delivery, including: generating, by a first module executing on a computing device, an event for a resource, identifying, by the first module, a resource identifier (ID) for the resource; identifying a second module responsible for the resource, wherein the identifying includes: providing the resource ID to a function; and receiving as an output from the function a module identifier (ID) for the second module; and sending the event to the second module based on the identified module ID.

In one embodiment, the method includes: forwarding the event to a resource identified by the resource ID, wherein the resource generates an output in response to the event.

In one embodiment, the event is a ringing event.

In one embodiment, the method includes: receiving, by the resource, the ringing event; and generating, by the resource, a ringing alert.

In one embodiment, the method includes routing a call to an agent device associated with the resource ID.

In one embodiment, the event is a screen pop event.

In one embodiment, the method includes: receiving, by the resource, the screen pop event; and generating, by the resource, a screen pop.

In one embodiment, the function is a hash function.

In one embodiment, the hash function is a consistent hash function.

In one embodiment, the hash function includes: a first basic hash function configured to map resource identifiers into a range; and a second basic hash function configured to map module identifiers into the range.

In one embodiment, the second basic hash function is further configured to map a replica of each module identifier into the range.

In one embodiment, the hash function is configured to map resource identifiers corresponding to resources in a geographic region into module identifiers corresponding to modules executing on computing devices in the geographic region.

BRIEF DESCRIPTION OF THE DRAWINGS

These and other features and advantages of the present invention will become appreciated as the same become better understood with reference to the specification, claims and appended drawings wherein:

DETAILED DESCRIPTION

The detailed description set forth below in connection with the appended drawings is intended as a description of exemplary embodiments of a SIP cluster provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
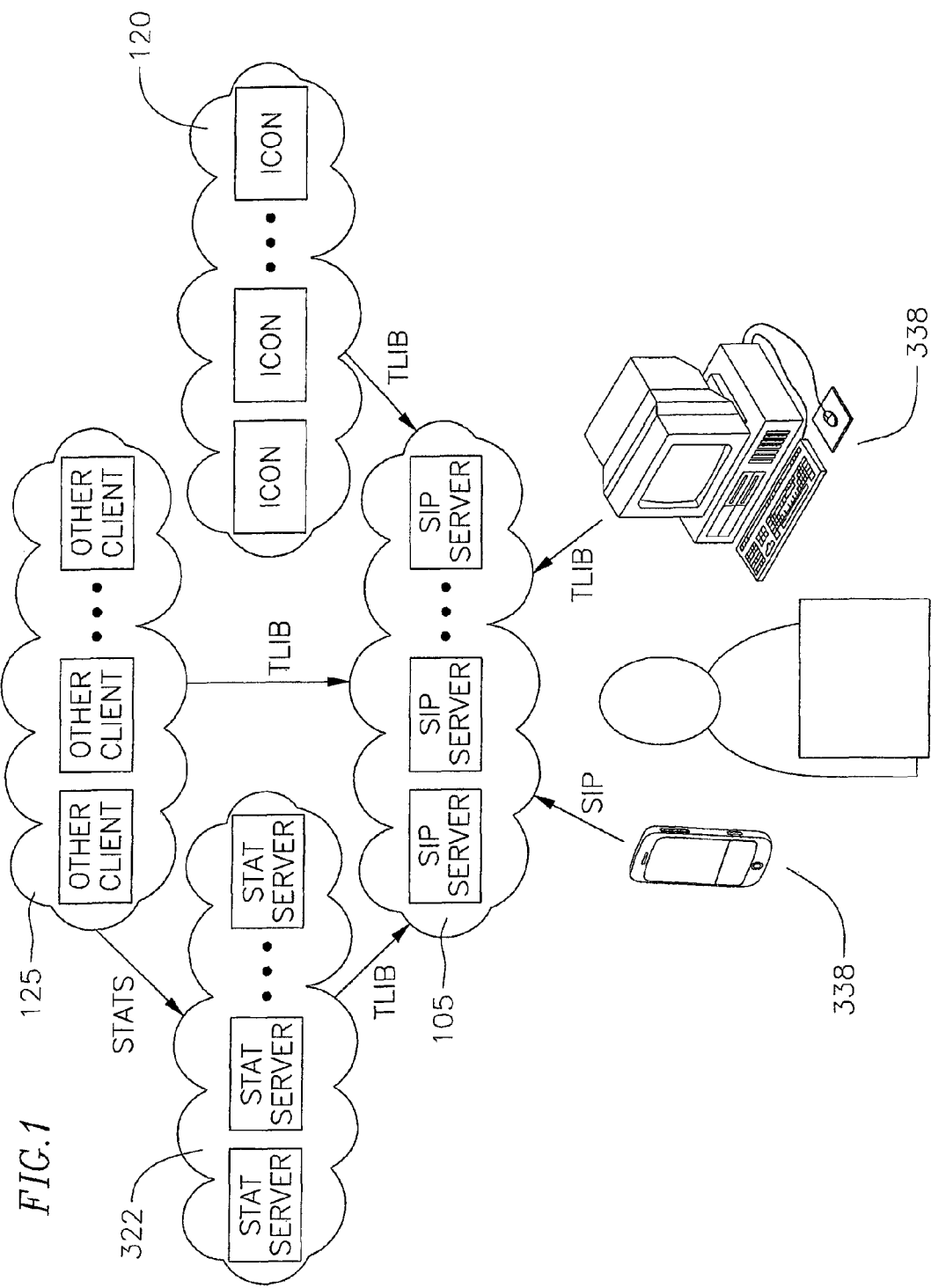
FIG. 1 is a schematic diagram of layers of servers and agent devices interfacing to a SIP cluster according to an exemplary embodiment of the present invention.

FIG. 1 is a schematic diagram of layers of servers and agent devices interfacing to a SIP cluster in a system supporting a contact center according to one exemplary embodiment of the invention. The contact center may be an in-house facility to a business or corporation for serving the enterprise in performing the functions of sales and service relative to the products and services available through the enterprise. In another exemplary embodiment, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

In an exemplary embodiment, a contact center may include a number of agent devices 338, each suitable for being operated by an agent, and each connected to servers in the contact center. A cluster of session initiation protocol servers (SIP servers), which may be referred to as a SIP cluster 105, may provide an interface layer to the agent devices 338, and other contact center modules may interface with the SIP server layer by making requests and receiving responses according to an interface which may be referred to as a T-library, TLib, or T-Lib. Other interfaces may also be used for communication between the modules in the contact center, including SIP and sockets, which may be used to exchange events. For example, one or more statistics servers or stat servers 322 may be employed to aggregate and maintain information about such dynamic data as agent availability; these stat servers 322 may query the SIP cluster 105 for relevant data, and make it available to clients. Such a client may be a graphical user interface operated by a contact center supervisor monitoring the operation of the contact center. A reporting layer, including one or more instances of an interaction concentrator 120 (ICON 120), may also monitor the SIP server layer and capture information about calls arriving at the contact center, and store them for subsequent analysis or troubleshooting. Other clients 125 may interact with both the SIP cluster 105 and the stat servers 322 to provide management, troubleshooting, or reporting functions, or the like.

Figure 2:
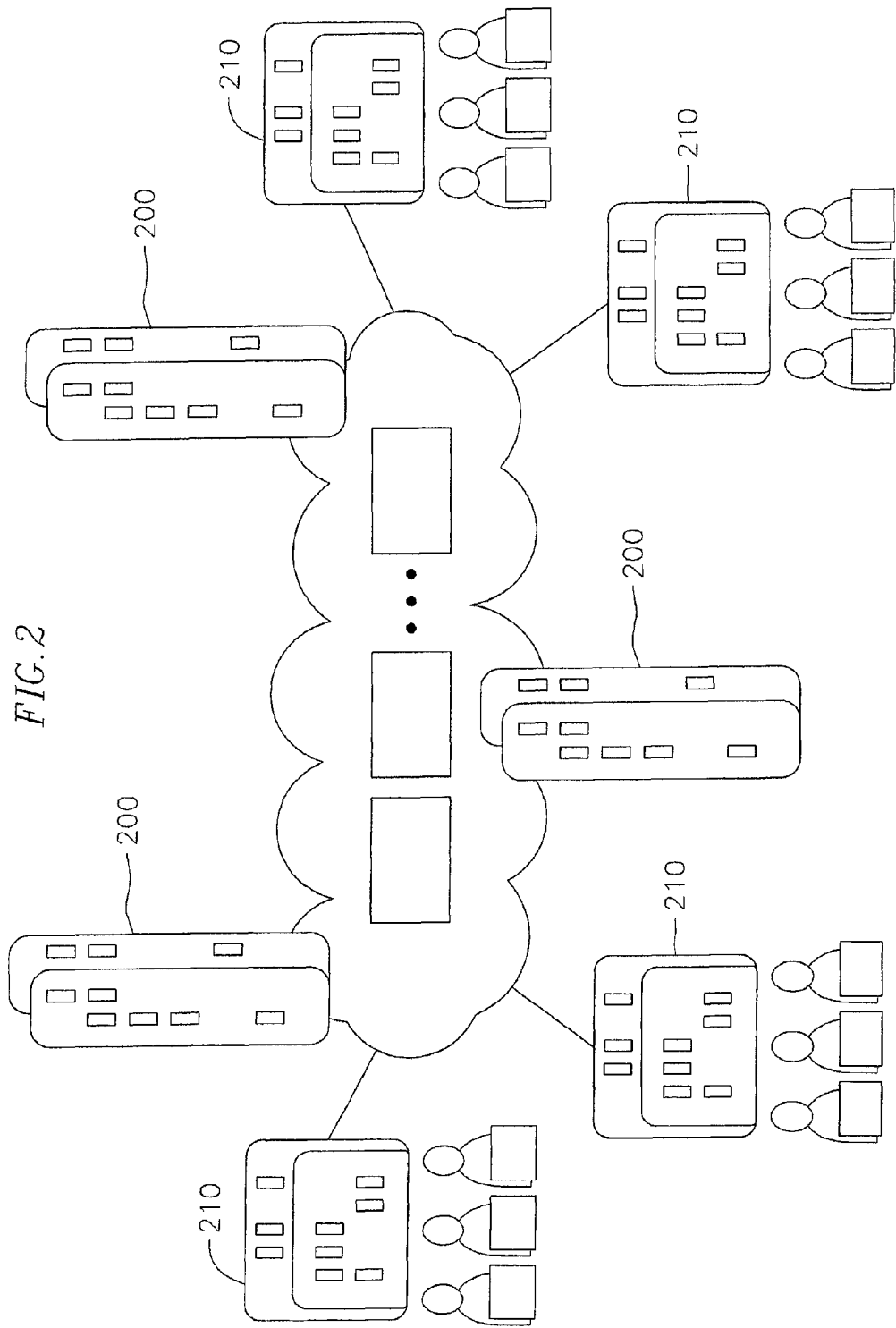
FIG. 2 is a schematic diagram of data centers and contact centers according to an exemplary embodiment of the present invention.

FIG. 2 illustrates a geographically distributed contact center according to an exemplary embodiment, with a physical presence in multiple geographic locations, which may be distributed over multiple countries. Some locations, which may be referred to as data centers 200, may include equipment, such as computers, data storage equipment, and connectivity equipment, along with one or more external communications connections to networks outside of the data centers 200, such as the public switched telephone network (PSTN) or the Internet. Other locations, which may be referred to as agent sites 210, may include equipment, such as computers, data storage equipment, and connectivity equipment, and also agent devices 338 (FIG. 3) and facilities allowing human agents to work within the agent sites 210 and use the agent devices 338. The extent to which an agent site 210 hosts hardware may depend on the nature and size of the facility and on the number of agents the agent site 210 is intended to accommodate. A large agent site 210 may host considerable computing, storage, and networking resources; a home agent site, e.g., the home of an agent working from home, may contain a SIP phone or a SIP phone and a computer, or, if the external communication connection is a PSTN connection, a computer running telephony software using a Telephony Application Programming Interface (TAPI) layer. The SIP cluster 105 may span the contact center, with SIP servers 318 (FIG. 3), e.g., instances of the SIP server process, running on machines in several, or all, of the geographic locations. The SIP servers 318 of the SIP cluster 105 may be in communication with each other.

Figure 3:
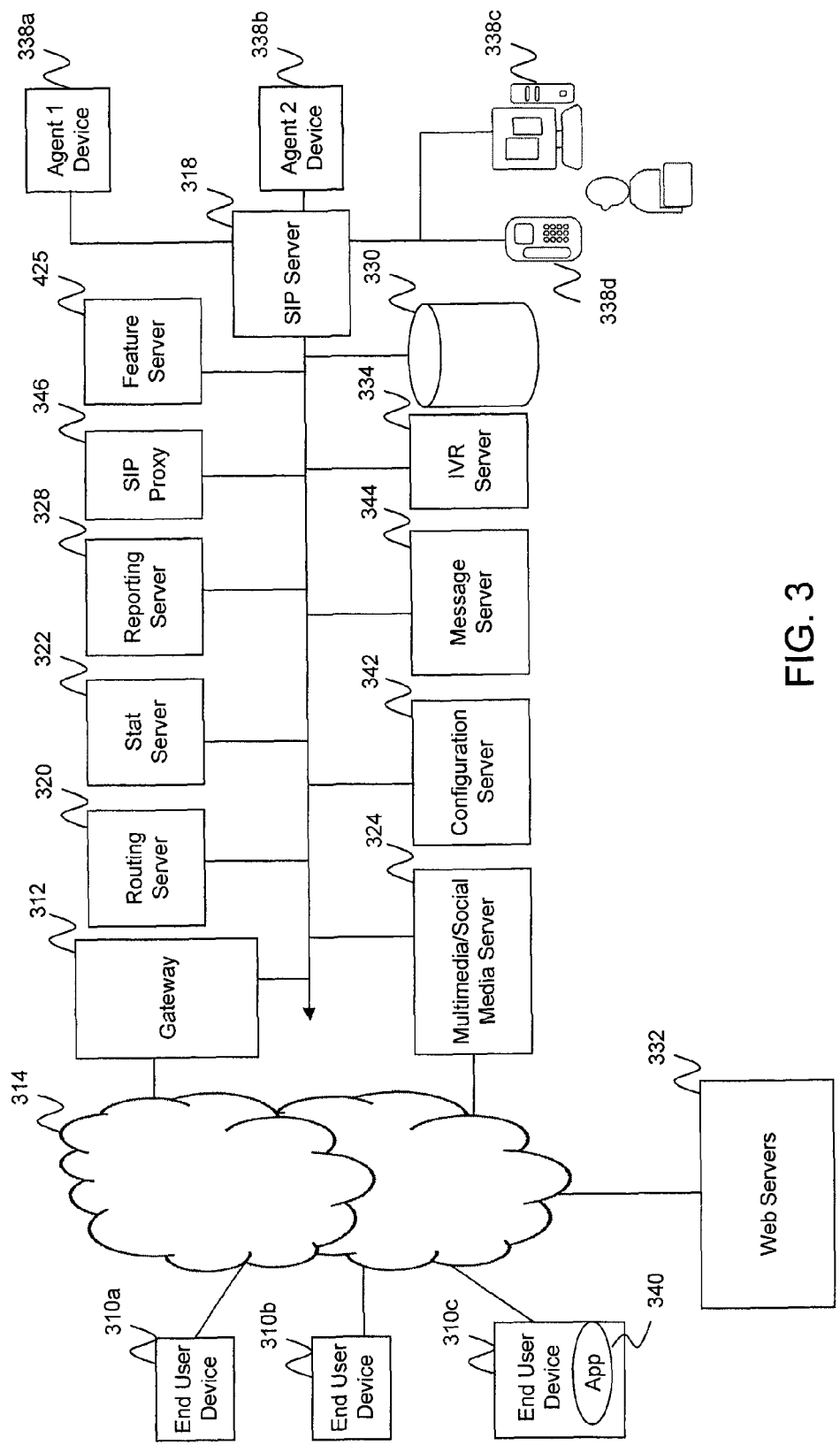
FIG. 3 is a schematic diagram showing exemplary server modules in a contact center according to an exemplary embodiment of the present invention.

FIG. 3 illustrates an exemplary embodiment of an agent site 210, which may be a contact center or part of a larger contact center, customers, potential customers, or other end users (collectively referred to as end users) desiring to receive services from the contact center may initiate inbound calls to the contact center via their end user devices 310a-310c (collectively referenced as 310). Each of the end user devices 310 may be a communication device conventional in the art, such as, for example, a telephone, wireless phone, smart phone, personal computer, electronic tablet, and/or the like. The mechanisms of contact in a call, and the corresponding user devices 310, need not be limited to real-time voice communications as in a traditional telephone call, but may be non-voice communications including text, video, and the like, and may include email or other non-real-time means of communication. Thus the term "call" as used herein is not limited to a traditional telephone call but is a generalized term including any form of communication in which a contact center may participate.

Inbound and outbound calls from and to the end user devices 310 may traverse a telephone, cellular, and/or data communication network 314 depending on the type of device that is being used. For example, the communications network 314 may include a private or public switched telephone network (PSTN), local area network (LAN), private wide area network (WAN), and/or public wide area network such as, for example, the Internet. The communications network 314 may also include a wireless carrier network including a code division multiple access (CDMA) network, global system for mobile communications (GSM) network, and/or any 3G or 4G network conventional in the art.

According to one exemplary embodiment, the contact center includes a gateway 312 coupled to the communications network 314 for receiving and transmitting calls and/or data between end users and the contact center. The gateway 312 may provide an interface between the internal network of the contact center and one or more external networks.

The contact center may also include a multimedia/social media server 324, which may also be referred to as an interaction server, for engaging in media interactions other than voice interactions with the end user devices 310 and/or web servers 332. The media interactions may be related, for example, to email, chat, text-messaging, web, social media, and the like. The web servers 332 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like. Although in FIG. 3 only one instance of each of the servers is shown, a contact center may contain multiple instances of any server, and it may be advantageous to operate multiple instances for load sharing and to improve performance.

According to one exemplary embodiment of the invention, the gateway 312 is coupled to an interactive voice response (IVR) server 334. IVR is a technology that allows a computer to interact with humans through the use of voice and dual-tone multi-frequency (DTMF) tones input via keypad. In telecommunications, IVR allows customers to interact with a contact center via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions. In one exemplary embodiment, the IVR server 334 is configured, for example, with an IVR script for querying customers on their needs. The IVR server 334 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

Once an appropriate agent is available to handle a call, the call is transferred to the corresponding agent device 338a-338d (collectively referenced as 338). An agent device may be a telephone or it may be a computer with an attached display, such as agent device 338c, which may be referred to as an agent desktop. Collected information about the caller and/or the caller's historical information may also be provided to the agent device for aiding the agent in better servicing the call. In this regard, each agent device 338 may include a telephone adapted for regular telephone calls, VoIP calls, and the like. The agent device 338 may also include a computer for communicating with one or more servers of the contact center and performing data processing associated with contact center operations. The selection of an appropriate agent for routing an inbound call may be based, for example, on a routing strategy employed by the routing server 320, and further based on information about agent availability, skills, and other routing parameters provided, for example, by a statistics server 322, which may also be referred to as a stat server 322. A SIP server 318 provides an interface to agent devices 338.

The multimedia/social media server 324 may also be configured to provide, to an end user, a mobile application 340 for downloading onto the end user device 310. The mobile application 340 may provide user configurable settings that indicate, for example, whether the user is available, or not available, or the user's availability is unknown, for purposes of being contacted by a contact center agent.

The contact center may also include a reporting server 328 configured to generate reports from data aggregated by the stat server 322. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

To store configuration information such as device characteristics and agent attributes, such as agent skill levels, a configuration server 342 may be included in the system. The configuration server 342 may, for example, provide attribute values for objects or processes when these are created, at system startup, or subsequently. A feature server 425 may provide various features within the contact center, such as voice mail and a dial plan, and a SIP proxy 346, which performs the functions of a SIP element also known in the art as a SIP registrar.

According to one exemplary embodiment of the invention, the contact center also includes a mass storage device 330 for storing data related to contact center operations such as, for example, information related to agents, customers, customer interactions, and the like. The mass storage device may take the form of a hard disk or disk array as is conventional in the art.

Each of the various servers of FIG. 3 may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

Each module may for example be a thread or a process. The modules in the contact center may communicate by various means, including events and messages. Two modules may be connected by a point-to-point socket connection, and in this case either module may send events to the other. Messages may be sent by one module to another module via a message server 344, which also provides the ability to send a broadcast message to multiple recipient modules simultaneously. Other messages known in the art, and referred to herein, as SIP messages, may also be exchanged between the modules of the contact center and with entities external to the contact center.

It may be advantageous for the software and hardware employed in a contact center to be modular, scalable, readily expanded or reduced in size, and suitable for providing high availability service. A modular design, using multiple copies of identical modules of different types, configured at startup or reconfigured at run-time, may be operated to provide these advantages. The size of the deployment may be changed by increasing or decreasing the number of modules executing, adding processors to the system if necessary. High availability may be provided, for example, by mirroring state information between modules, so that several modules are in a position to perform any given task, so that if one module fails, as a result of a software error or hardware failure, another module, operating on another processor if necessary, may perform the failed module's tasks. Scalability may be achieved by design practices which avoid bottlenecks in data flow or processing resources, e.g., design practices which avoid routing large volumes of data through a single central location.

Figure 4:
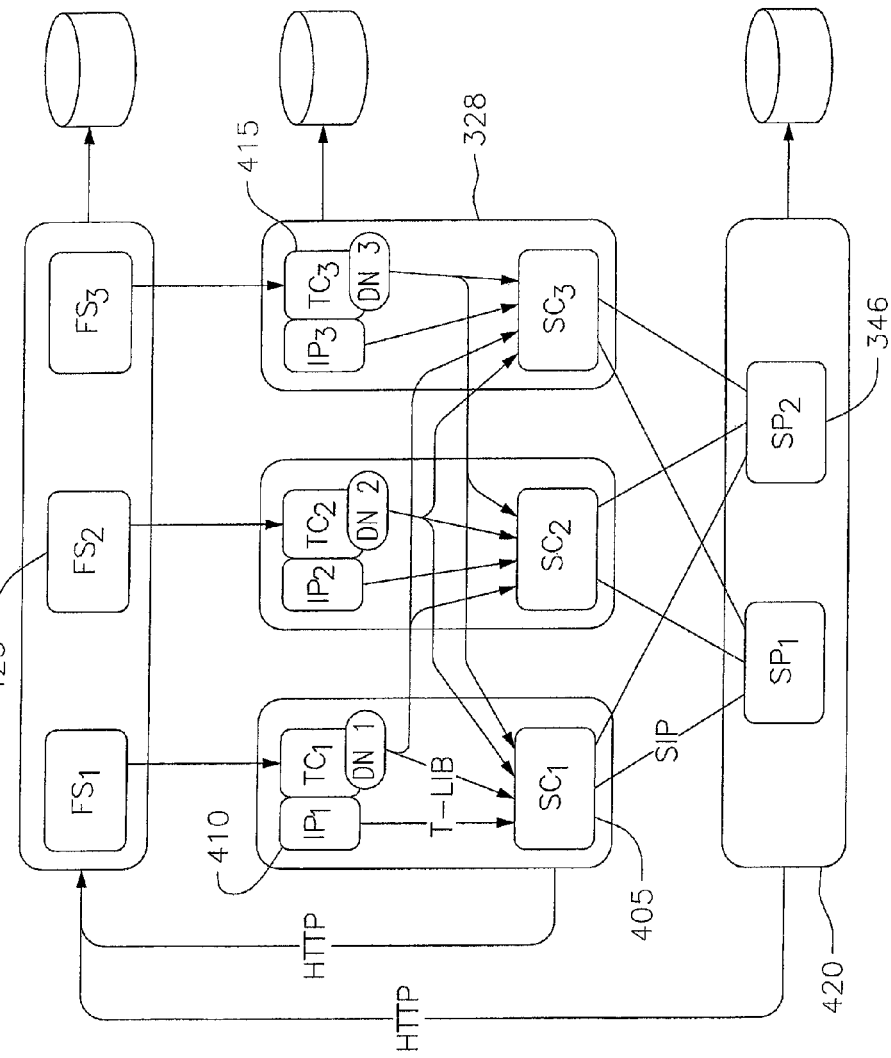
FIG. 4 is a schematic diagram of several SIP servers in a SIP cluster, interfacing with a feature server layer and a SIP proxy layer, according to an exemplary embodiment of the present invention.

FIG. 4 illustrates several SIP servers 318 forming a SIP cluster, along with a feature server layer and a SIP proxy layer 420, according to an exemplary embodiment. Each SIP server 318 may contain, or include, several modules, such as a session controller (SC) 405, an interaction proxy (IP) 410 and a T-controller (TC) 415, each of which may run as one or more threads within the SIP server process. Two additional layers, a SIP proxy (SP) layer 420, and a layer of feature servers 425 (FS), may provide services for the SIP server 318. The SIP proxy layer 420 may contain, for example, instances of the SIP proxy 346.

Each agent device may be associated with one or more directory numbers (DNs). A DN may be an identifier for a network endpoint at a user interface. A telephone may, for example, have a DN corresponding to its phone number, or it may have multiple DNs if it supports multiple lines, each of which may be a DN. Other DNs may be implemented in an IVR, or in a session controller 405 (where the DN may be known as a route point) for the purpose of providing a temporary hold location for a call. Other types of identifiers used with other user interfaces, such as an email address, or a login identity for chat, may also be DNs. In the SIP server 318, each T-controller 415 may own, for example by overseeing or being responsible for, multiple agent device DNs, where ownership in this context implies a many-to-one relationship: in this case a T-controller 415 may own many agent device DNs and each agent device DN may have one owner.

I. Dynamic Changes in SIP Cluster Size

In operation, it may on occasion be advantageous to remove a SIP server 318 from the SIP cluster 105, or to add a SIP server 318 to the cluster. For example, if a computing device on which a SIP server 318 executes requires service, the SIP server 318 may be removed from the SIP cluster 105, and the computing device may be shut down. The computing device may be replaced with another computing device, on which a new instance of the SIP server 318 may be started, and the new SIP server may be added to the SIP cluster 105. It may be advantageous to be able to perform these operations with as little disruption as possible.

Each SIP server instance may contain a T-controller 415 which may own multiple DNs, and which may maintain state information for the DNs it owns. A T-controller may own many DNs, e.g., 4,000 DNs, and the total number of DNs in the contact center may be significantly larger still. It may be advantageous for a module in the contact center initiating an interaction with a DN to identify the T-controller owning the DN. It may, however, be costly to maintain a complete record of DN ownership in each such module, because of the potentially large volume of data involved, and the cost of keeping this data current as the contact center changes dynamically, e.g., as SIP servers 318 or DNs are added or removed. Moreover, any solution involving centralized storage of a complete record of DN ownership may result in a data flow or processing bottleneck. To reduce the effect of these drawbacks, a hash function may be used to map the set of DNs onto the set of SIP servers 318 and, thereby, to the set of T-controllers owning the respective DNs.

It may be advantageous for the hash function to have properties that result in the least disruption possible when a SIP server 318 is added or removed. When a SIP server 318 is added or removed, some DNs previously mapped, by the hash function, to other SIP servers 318, may become mapped to the new SIP server; conversely when a SIP server 318 is removed, the DNs mapped to the SIP server being removed may become mapped to other SIP servers 318. It may be advantageous for the new ownership mapping to result in the smallest number of DNs changing owners. For example, it may be advantageous for a change in ownership to occur for the DNs assigned to a SIP server that is being removed, or for DNs which are being transferred to a SIP server which is being added.

The hash function used to identify the DN owners may map the set of DNs onto the set of SIP servers. Because the set of SIP servers may change when a SIP server 318 is added or removed, a set of SIP server identifiers, e.g., unique identifiers assigned to each SIP server 318, may be an input when the hash function is executed. The identifier of the DN being mapped to an owner may also be an input to the hash function. The output of the hash function may be the identifier of the SIP server which owns the DN, through the T-controller executing in the SIP server.

In one exemplary embodiment, when a SIP server 318 is removed from the SIP cluster 105, it transfers its state information and its responsibilities, such as DN ownership, to another SIP server 318, so that the operation, e.g., of the DNs owned by the SIP server being removed from the cluster, may continue without interruption.

Figure 5B:
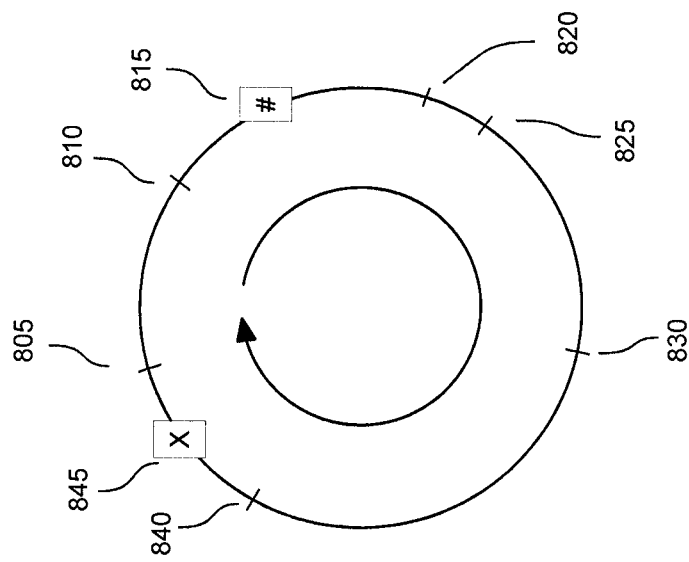
FIG. 5B is a version of the diagram of FIG. 5A with a SIP server removed, according to an exemplary embodiment of the present invention.
Figure 5A:
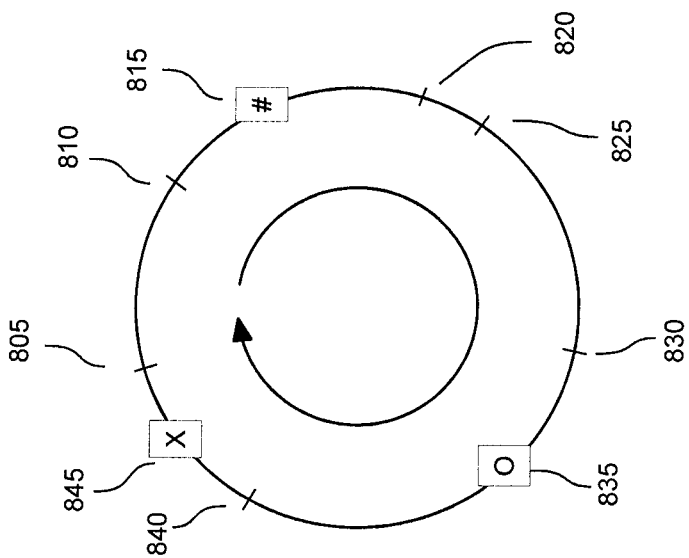
FIG. 5A is a diagram of the mapping of SIP servers and DNs into a circular range to implement a consistent hash function according to an exemplary embodiment of the present invention.

In one embodiment, consistent hashing may be used to provide a hash function to map each DN to its owner SIP server, in a manner that results in little disruption when a SIP server 318 is added or removed. FIG. 5A shows a layout diagram illustrating a mapping, by a consistent hash function, of six DNs to three SIP servers, and FIG. 5B shows a layout diagram illustrating a mapping, by the same consistent hash function, of six DNs to two SIP servers. A consistent hash function which maps the domain of DN identifiers into the range of SIP server identifiers may be constructed using a first basic hash function, which need not be a consistent hash function, to map the DN identifiers to an interim range, which may be a range of integers. A second basic hash function, which may be the same hash function as the first basic hash function, having the same range, may be used to map the SIP servers identifiers to the same interim range. The interim range may be mapped to a circle, and the consistent hash function is the mapping that results when the DN is mapped to the nearest SIP server hash point, when proceeding in a clockwise direction on the circle. In the example depicted in FIG. 5A, in an initial state a first DN 805 and a second DN 810 are mapped to a first SIP server 815; a third DN 820, a fourth DN 825 and a fifth DN 830 are mapped to a second SIP server 835; and a sixth DN 840 is mapped to a third SIP server 845. If the second SIP server 835 is removed (FIG. 5B), the first DN 805 and the second DN 810 remain mapped to the first SIP server 815, because it remains the nearest point to them on the circle in a clockwise direction. After the removal of the second SIP server 835, the third DN 820, the fourth DN 825 and the fifth DN 830 are mapped to the third SIP server. The sixth DN 840 remains mapped to the third SIP server 845. In this example, the DNs which move to a different owner, e.g., SIP server, as a result of the removal of the second SIP server 835 are the third DN 820, the fourth DN 825 and the fifth DN 830, which could not remain mapped to the second SIP server 835 after the second SIP server 835 was removed. In this example, none of the DNs mapped to the first SIP server 815 are moved to the third SIP server 845, nor vice versa, as a result of the removal of the second SIP server 835.

Similarly, if the initial state were the one of FIG. 5B, with two SIP servers, the first SIP server 815 and the third SIP server 845, and the final state the one of FIG. 5A, with three SIP servers, then the addition of one SIP server, the second SIP server 835, would again result in the reassignment of three DNs, the third DN 820, the fourth DN 825 and the fifth DN 830, which would be moved to the newly added second SIP server 835.

Figure 5C:
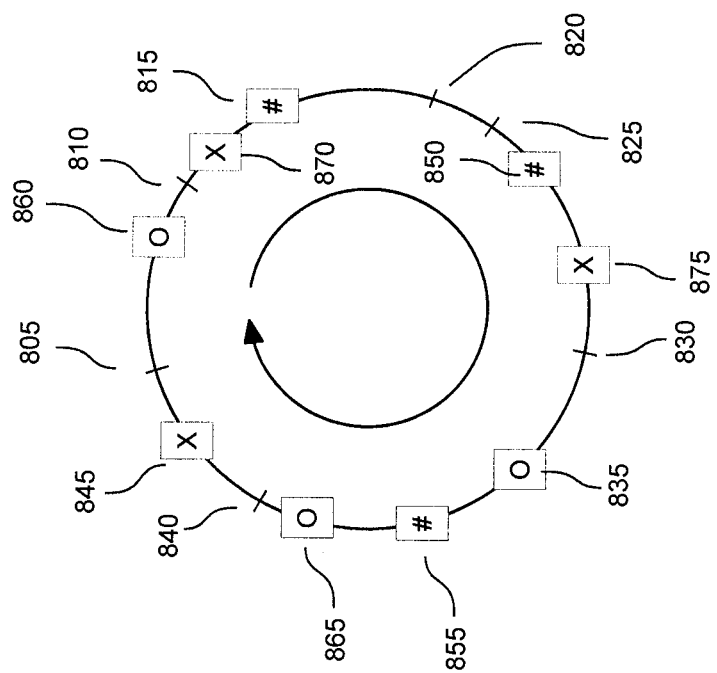
FIG. 5C is a version of the diagram of FIG. 5A with replicas mapped into the circular range for the SIP servers, according to an exemplary embodiment of the present invention.

The uniformity of the distribution of DNs across SIP servers may be improved by hashing one or more replicas of each SIP server identifier into the range, e.g., onto the circle. This may be done, for example, for each SIP server, one at a time, by executing one of the basic hash functions, or another hash function having the same range, repeatedly, each time using as input the output of the last execution of the hash function. Each new output forms an additional replica in the range. In this example, a DN may be mapped to a SIP server 318 when the SIP server identifier or one of its replicas is the nearest point on the circle in a clockwise direction, to the hash of the DN identifier. FIG. 5C shows a layout diagram of a mapping formed using replicas of SIP server identifiers, according to an exemplary embodiment. If replicas 850, 855 of the first SIP server 815, replicas 860, 865 of the second SIP server 835, and replicas 870, 875 of the third SIP server 845 are added, then the consistent hash function will map the third DN 820 and the fourth DN 825 to the first SIP server 815 through its replica 850, the first DN 805 and the fifth DN 830 to the second SIP server 835 (the former through the replica 860) and the second DN 810 and the sixth DN 840 to the third SIP server 845 (the former through the replica 870), e.g., two DNs are mapped to each SIP server. The use of replicas and the resulting improved uniformity of the distribution of DNs across SIP servers may mean that the number of DNs owned by the various SIP servers is more nearly the same than in the absence of the use of replicas, in which case some SIP servers may own few DNs and some may own many. Although particular numbers of SIP servers and DNs have been used for purposes of illustration in these examples, the invention is not limited thereto, and may be used with different numbers of SIP servers and DNs.

Consistent hashing is discussed in Karger, D.; Lehman, E.; Leighton, T.; Panigrahy, R.; Levine, M.; Lewin, D. (1997) "Consistent Hashing and Random Trees: Distributed Caching Protocols for Relieving Hot Spots on the World Wide Web," Proceedings of the Twenty-ninth Annual ACM Symposium on Theory of Computing, the contents of which are incorporated herein by reference.

It should be apparent to one of skill in the art that the invention is not limited to the consistent hash described in this example, and that the interim range, for example, may be a range of floating point numbers, for example, or a range of string values. It should also be apparent that the mapping of the interim range to a circle is a conceptual device for illustrating a mapping to a range with a wrapping characteristic, so that the last element in the range is defined to be adjacent to the first. The DNs may equally well be mapped to the nearest SIP server in a counterclockwise direction, instead of in a clockwise direction. The hash function need not be a consistent hash function but may be any other hash function with, or without, the characteristic of producing minimal disruption, e.g., minimal re-mapping of owned objects, e.g., DNs, to owners, e.g., SIP servers or T-controllers, when the set of owners is changed.

If a contact center is geographically distributed, it may be advantageous to have SIP server instances located near, e.g., in the same country as, the DNs they own, through their T-controllers. This may be accomplished by defining a different consistent hash function for each geographic region. For example, to determine the owner of a DN in country A, the consistent hash function may be executed with input including SIP server identifiers corresponding to SIP servers executing on computing devices in country A.

Figure 6:
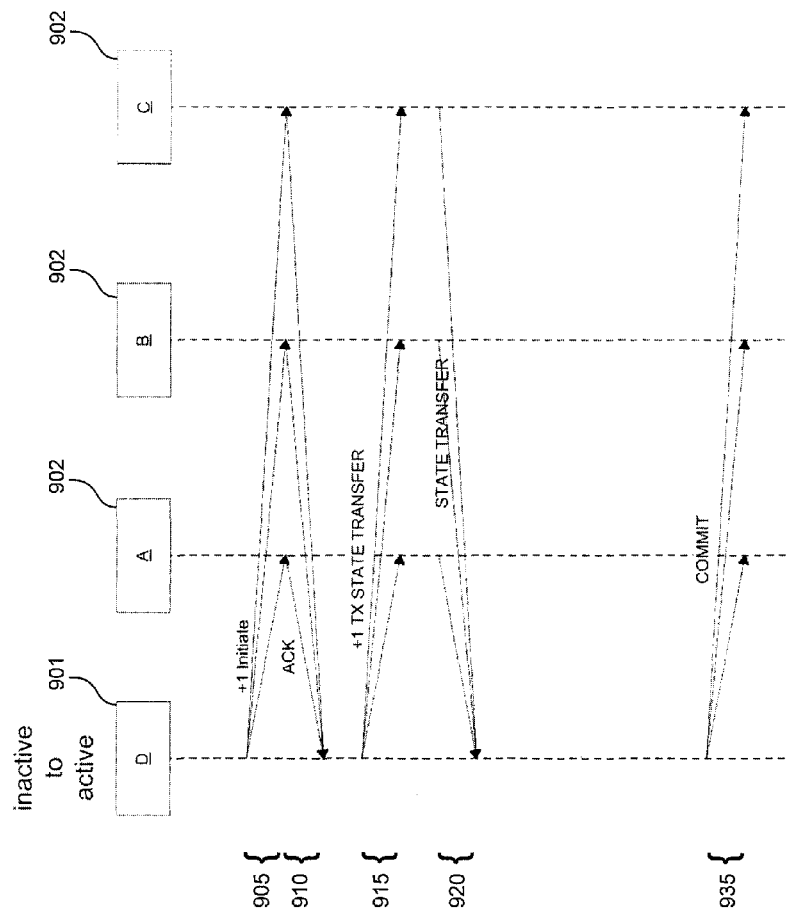
FIG. 6 is a message sequence diagram showing acts involved in adding a SIP server to a SIP cluster according to an exemplary embodiment of the present invention.

FIG. 6 is a message sequence diagram illustrating the addition of a SIP server to a SIP cluster according to an exemplary embodiment. The addition of a SIP server to a SIP cluster may proceed in several acts. In act 905, a SIP server 901 to be added, may send an initiate message to each of the existing SIP servers 902, notifying them that the process of adding a new SIP server 901 has been initiated. Each of the existing SIP servers 902 may, in act 910, respond with an initiation acknowledge message. In act 915, the new SIP server 901 may send a state transfer request to the existing SIP servers 902. The existing SIP servers 902 may, in act 920, respond by transferring, to the new SIP server 901, state information for any DNs being moved, as determined by the hash function, which may be executed with a list of SIP servers including the new SIP server 901. Such state information may include the status of the DN, e.g., whether the DN is on hook, off hook, whether a call is being dialed from the DN, or whether the DN is in an after call work state, which may be used when an agent is performing post-interaction work after completing a call. The new SIP server 901 may, in act 935, send a commit message to each existing SIP server to finalize the new SIP cluster configuration, which then may include the new SIP server 901. In the interval between receipt of the initiate message and the receipt of the commit message, the existing SIP servers may stop processing events, e.g., place all events related to the affected DNs on hold. The commit message may notify the other SIP servers that the process of adding the new SIP server has been finalized and that the other SIP servers are no longer responsible for the DNs which have been moved, and that they may delete the state information for these DNs. Although the acts are described in a particular order in this example, the invention is not limited to acts occurring in this order, and some or all of the acts may take place in a different order, or in parallel.

Figure 7:
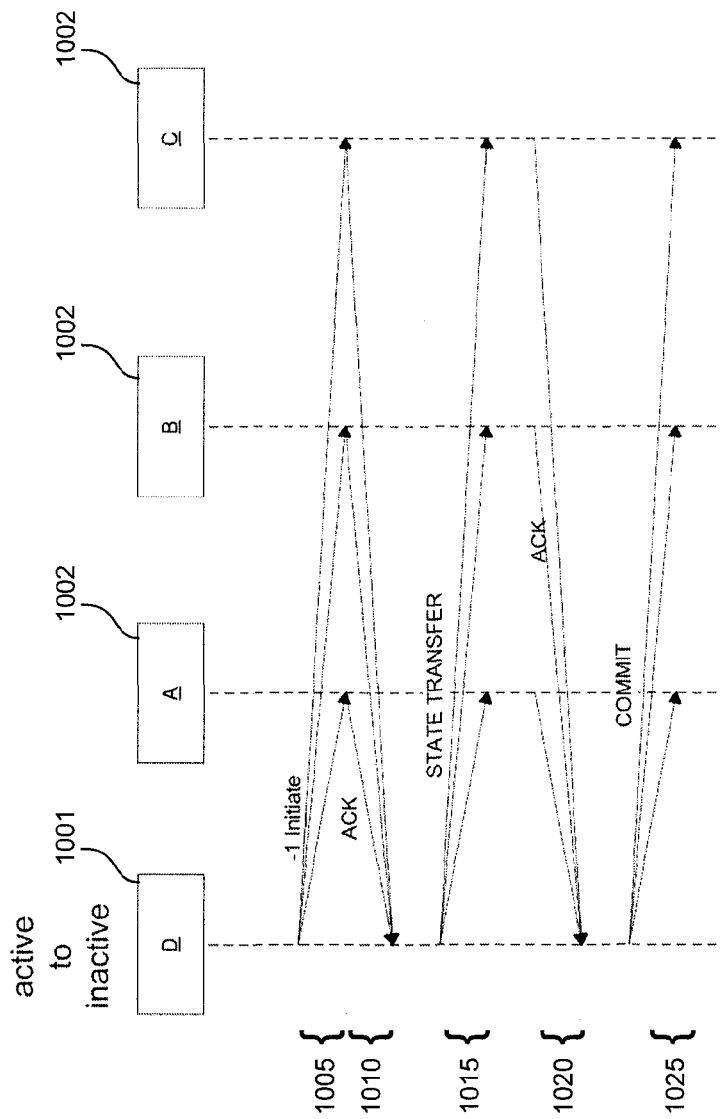
FIG. 7 is a message sequence diagram showing acts involved in removing a SIP server from a SIP cluster according to an exemplary embodiment of the present invention.

FIG. 7 is a message sequence diagram illustrating the removal of a SIP server from a SIP cluster according to an exemplary embodiment. When a SIP server 1001 is to be removed from a SIP cluster, it may transfer the state information in its possession to the other SIP servers 1002 in the SIP cluster. In act 1005, the SIP server 1001 being removed may send an initiate message to each of the other SIP servers 1002, notifying them that the process of removing the SIP server being removed has been initiated. Each of the other SIP servers 1002 may, in act 1010, respond with an initiation acknowledge message. The SIP server being removed may, in act 1015, transfer its state information to the other SIP servers, transferring state information for each DN to the SIP server which will become the owner of the DN. The new owner for each DN is identified by the hash function, which is executed with a list of SIP servers excluding the SIP server 1001 being removed. Each of the other SIP servers 1002 may, in act 1020, send a state information acknowledge message, acknowledging that it has received the state information, and in act 1025, the SIP server being removed may send a commit message. The SIP server being removed may stop processing events when it sends the initiate message. The other SIP servers may stop processing events, e.g., place all events related to the affected DNs on hold, in the interval between the initiate message and the receipt of the commit message. The commit message may notify the other SIP servers that the process of removing the SIP server 1001 being removed has been finalized and that the other SIP servers have become responsible for the DNs, and for maintaining state information for the DNs. Although the acts are described in a particular order in this example, the invention is not limited to acts occurring in this order, and some or all of the acts may take place in a different order, or in parallel.

Figure 8:
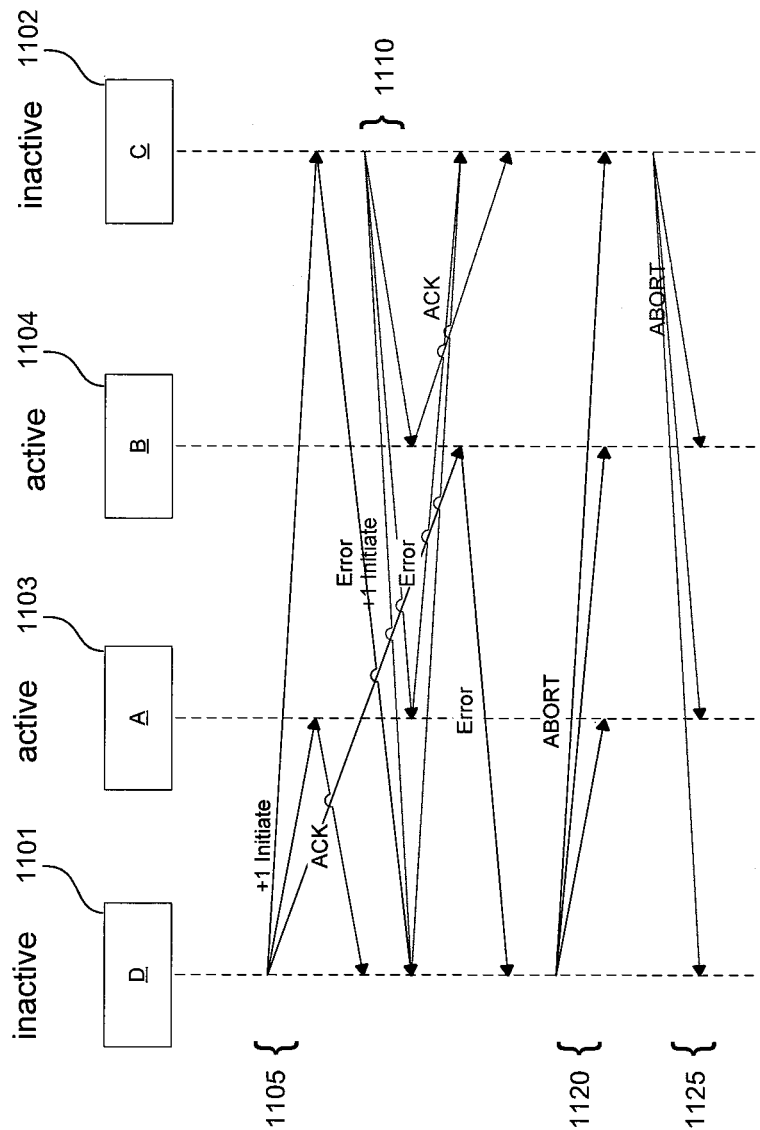
FIG. 8 is a message sequence diagram showing acts involved in responding to a failed attempt to add two SIP servers to a SIP cluster according to an exemplary embodiment of the present invention.

FIG. 8 is a message sequence diagram illustrating recovery from an unsuccessful attempt to add two SIP servers to a SIP cluster according to an exemplary embodiment. An attempt to add a SIP server 1101 may be unsuccessful if there is an attempt to add another SIP server 1102 at nearly the same time. For example a first new SIP server 1101 may send, in act 1105, a first initiate message to the existing SIP servers 1103, 1104, and the second new SIP server 1102 may send, in act 1110, a second initiate message to the existing SIP servers 1103, 1104. A first existing SIP server 1103 may receive the first initiate message first, whereas a second existing SIP server 1104 may receive the second initiate message first. In this case the first existing SIP server 1103 may reply with an acknowledge message to the first new SIP server 1101 and with an error message to the second new SIP server 1102, and the second new SIP server 1104 may reply with an acknowledge message to the second new SIP 1102 server and with an error message to the first new SIP server 1101. Each of the new SIP servers 1103, 1104, having received an error message in reply to an initiate message, may send an abort message 1120, 1125 to the existing SIP servers, terminating the attempt to add the new SIP servers. The SIP servers being added may each start a new attempt to join the SIP cluster, after waiting a random amount of time. Although the acts are described in a particular order in this example, the invention is not limited to acts occurring in this order, and some or all of the acts may take place in a different order, or in parallel.

Because a list of SIP servers may be input to the consistent hash function, any module that will execute this hash function may maintain a list of SIP servers. When a SIP server is added to or removed from the cluster, the configuration server, which may keep a list of SIP servers, may be notified. It may send out an update notification, announcing the change, in the form of a message or an event, to each module which previously registered to receive updates on the list of SIP servers. This avoids the need for each module to obtain an updated list of SIP servers from a central location, such as the configuration server, every time the consistent hash function is to be executed.

II. Agent Reservation in a Distributed System

When a call arrives at a contact center, information about the call and the caller may be gathered, such as the caller's history with the contact center and the purpose of the call. A target agent, e.g., an agent appropriate for handling the call, may be identified by a module, and it may be advantageous to route the call to a DN at which the target agent can be reached. To do so, it may be advantageous to identify a module which owns the DN, e.g., a T-controller which owns the DN, or a SIP server which contains the T-controller which owns the DN. This identification may be performed using the hash function which maps DNs to SIP servers.

Figure 9:
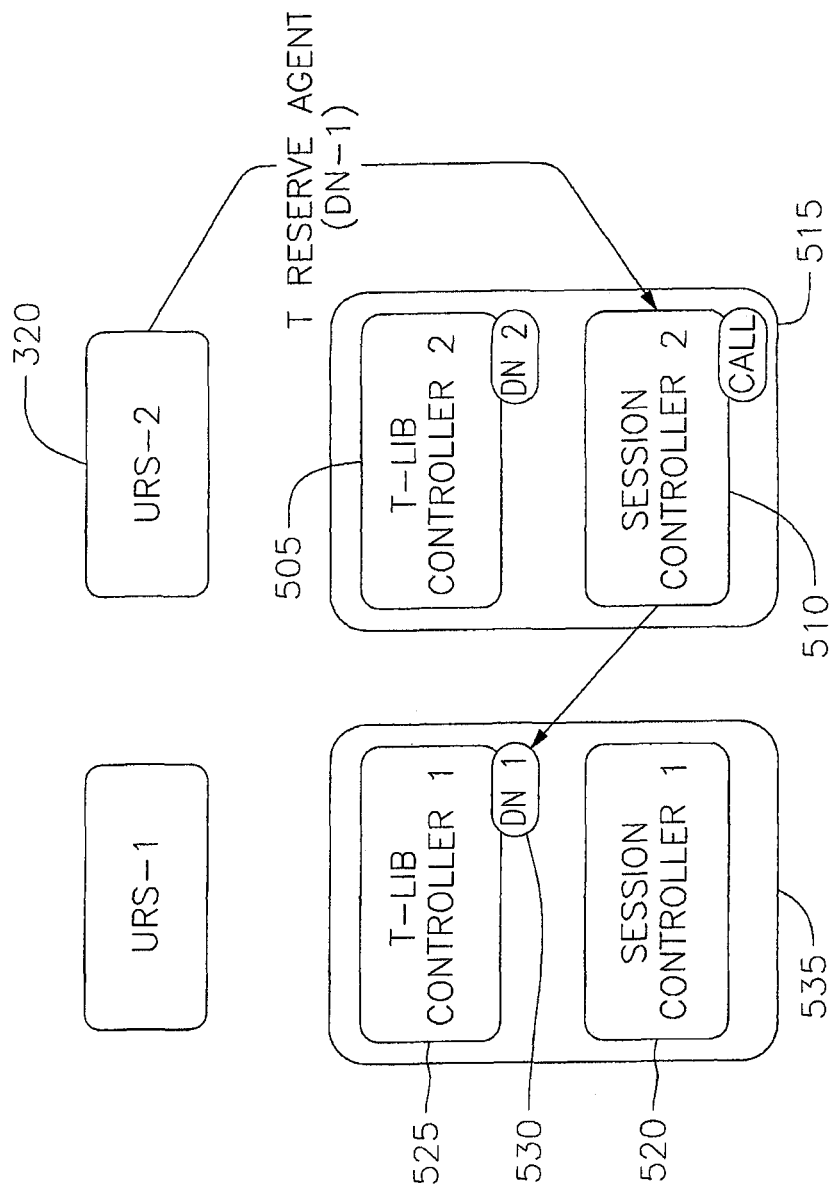
FIG. 9 is a schematic diagram of modules participating in agent reservation for an incoming call according to an exemplary embodiment of the present invention.

FIG. 9 shows several modules which may, in one exemplary embodiment, participate in the handling and routing of a call. When a call arrives at the contact center, it is handled by the SIP proxy layer, which assigns it to a first session controller 510. The assignment may be made in a manner which balances, as nearly as possible, the load on the session controllers 405, using, for example, a round-robin algorithm. The first session controller 510 is part of, for example, via a thread executing within, a first SIP server 515. Once assigned to the first session controller 510, the call is initially placed on a route point in the first session controller 510, such as, for example, on a DN in the first session controller 510, for temporarily holding the call. The routing server (URS) 320 may have subscribed to a list of available agents meeting certain criteria, provided by a stat server 322 (FIG. 3). The criteria may include, for example, certain combinations of skills. When an agent meeting the required criteria becomes available, or unavailable, the stat server may send a notification to the routing server 320, identifying the agent and the agent's DN, e.g., a DN to which the agent is logged in, and specifying whether the agent has become available or unavailable. This may allow the routing server 320 to maintain a current list of available agents meeting the criteria and their respective DNs. When the call arrives at the route point in the first session controller 510, the session controller may send an event, which may include call data, to various clients including the routing server 320, informing them of the arrival of the call. Upon receipt of this event, the routing server may use the call data, which may include IVR responses identifying, for example, a product of interest, to select a suitable agent from the list of available agents, e.g., an agent familiar with the product. Thus, when the routing server 320 selects a target agent and DN to which to attempt to route the call, the computing device on which the routing server 320 executes identifies a resource (e.g., an agent and a DN) appropriate for handling the call.

In an embodiment that may be referred to as involving implicit agent reservation, once the routing server 320 selects a target DN 530 to which to route a call, the routing server 320 sends to the first session controller 510 ("Session Controller 2" in FIG. 9) a routing request with an embedded implicit agent reservation request, instructing the first session controller 510 to attempt to route the call to the target DN 530 ("DN 1" in FIG. 9). The target DN 530 may be owned by a T-controller 525, in a SIP server 535, but the first session controller 510 may lack information about the location of the target DN 530, e.g., it may have received, in the routing request, an identifier for the target DN 530, but it may lack an identifier for the T-controller which owns the target DN 530, or for the SIP server which contains this T-controller. According to one embodiment, identification of the SIP server 535 responsible for the target DN 530 is based on the hash function, which may be executed by the first session controller 510 assigned to the call. According to one embodiment, the hash function maps an input DN to a unique identifier for the SIP server 535 containing the T-controller 525 which owns the input DN, e.g., the target DN 530.

In the illustrated example, the first session controller 510 is configured to execute the hash function using as input the target DN 530, identified by the routing server, and to identify, based on the hash function, the second session controller 520 which, according to the example, owns the target DN 530. Once the owner is identified, the first session controller 510 transmits an agent reservation request to the second session controller 520. In another embodiment, the T-controllers may instead perform some of these functions: the first session controller 510 sends the agent reservation request to a T-controller 505 which is in the same SIP server 515 as the first session controller 510. The T-controller 505 is configured to execute the hash function using as input the target DN 530, identified by the routing server 320, and to identify, based on the hash function, the T-controller 525 which, according to this embodiment, owns the target DN 530. Once the owner is identified, the T-controller 505 transmits an agent reservation request to the T-controller 525 which owns the target DN 530.

In the illustrated example, the T-controller 525 executing in the second SIP server 535 receives the agent reservation request, and accordingly, the computing device within which the T-controller 525 executes receives the request. In the terminology used herein, the computing device is said to receive the request whether the request originated from a thread or process executing in a different computing device or in the same computing device.

When the T-controller 525 receives the agent reservation request, it may respond with a message granting the reservation, or denying it. If the request is granted, the first session controller 510 may transfer the call to the agent's DN 530; if the request is denied, the first session controller 510 may notify the routing server 320 which then may make a renewed request to the stat server 322, for an alternate agent to handle the call.

Figure 10:
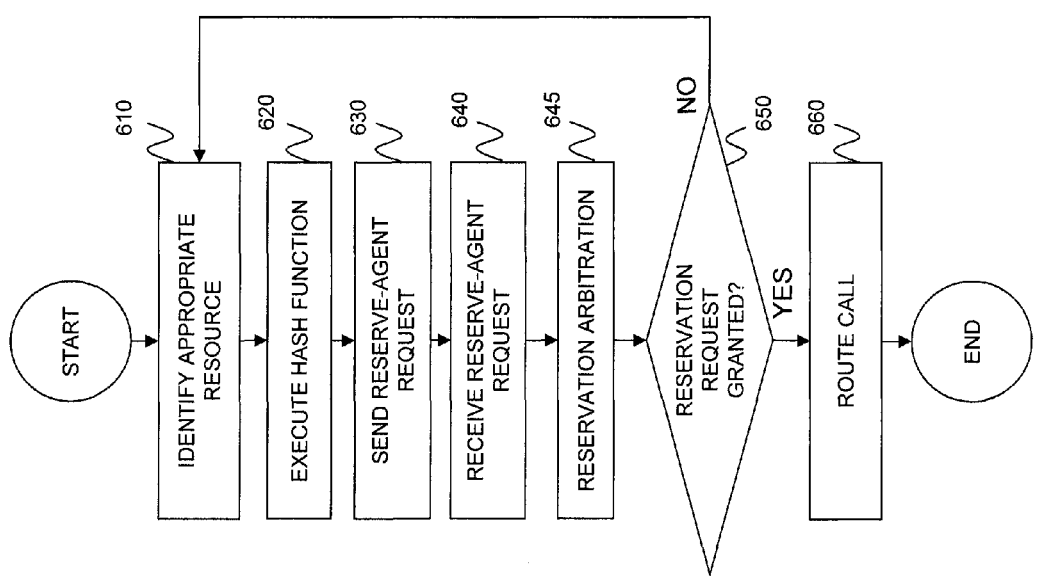
FIG. 10 is a flow chart showing acts involved in agent reservation according to an exemplary embodiment of the present invention.

FIG. 10 is a flow diagram of a process for distributed agent reservation according to one embodiment. In act 610, a routing server 320, executing on a computing device, identifies a resource, e.g., an agent, appropriate for handling a call held by the first session controller 510, and sends this information to the first session controller 510. In act 620, the first session controller 510 executes a hash function to identify the SIP server responsible for the resource, and, in act 630, the first session controller 510 sends an agent reservation request to the T-controller in the identified SIP server. The T-controller, in act 640, receives the request. In an act 645, the T-controller performs reservation arbitration as described below, and in act 650, determines whether to grant or deny the request. In one embodiment, the reservation arbitration is performed by an agent reservation module in the T-controller. If the request is granted, the first session controller 510 routes the call in act 660; otherwise, the process starts again with the routing server 320 identifying an alternate resource. As explained above, in one embodiment some of the acts, such as the execution of the hash function, are performed by another module, e.g., a T-controller. Although the acts are described in a particular order in this example, the invention is not limited to acts occurring in this order, and some or all of the acts may take place in a different order, or in parallel.

If the DN is already reserved, e.g., if another routing server has already sent an agent reservation request which has been granted, the T-controller may deny the agent reservation request. If the T-controller 525 has not yet granted an agent reservation request, the T-controller 525 may use an arbitration process to determine whether to grant or deny the request. In one exemplary embodiment, the T-controller 525 waits for some interval of time, for other agent reservation requests corresponding to other calls to arrive, and grants the agent reservation request having, for example, the highest priority, and denies the others. If several agent reservation requests have the same priority it may select, at random, one to be granted, and deny the others. The priority of an agent reservation request may be evaluated by the routing server 320, using an algorithm that takes into account various criteria, including, for example, a characteristic of the caller such as the value of the caller, e.g., whether the caller is expected to be a significant source of income to the enterprise, the hold time, e.g., the length of time the caller has already been waiting to speak with an agent, the suitability of the agent for the call, and/or the suitability of other agents for the call. For example, the request may be given higher priority if the caller needs help with a particular product and the agent is one of few agents at the contact center familiar with that product. The routing server then may send an assessment of the priority of the call along with the agent reservation request. In one embodiment, the reservation arbitration is performed by an agent reservation module in the T-controller.

Routing servers 320 may communicate with each other about call routing and/or agent selections as they are made, reducing the likelihood that two routers 320 will attempt to route different calls to the same agent. This mechanism is not foolproof, however, in part because the routing servers 320 may execute on different computing devices, resulting in communication delays. The agent reservation module acts as a central arbiter for the agent and the DN, making it possible for multiple routing servers 320 to obtain a reliable response granting or denying an agent reservation request.

In one exemplary embodiment, the first session controller 510 may make an explicit agent reservation request by sending an agent reservation request not embedded in a routing request to the first session controller 510. The second session controller 510 may execute the hash function to identify the second session controller 520, send the agent reservation request to the second session controller 520, and, whether or not the agent reservation request is granted, send a response to the routing server 320 indicating whether the agent reservation request was granted. If the agent reservation request is granted, the router then sends a route request to the first session controller 510, which routes the call to the T-controller 525 which owns the target DN 530.

Although in the examples described here the agent is associated with a single DN, the invention is not limited to this case, and the reservation logic may be expanded to include configurations in which an agent may be logged in to, or otherwise associated with, more than one DN.

A modular approach such as that of the present invention provides several benefits, including scalability, e.g., the ability to expand the size of an implementation without being constrained by performance bottlenecks, and resilience, e.g., the ability of the system to adjust quickly and without disruption to the failure of an element.

III. Delivery of Events to Agents in a Distributed System

If the agent reservation request is granted, the first session controller 510 may, in addition to routing the call to the target DN 530, generate an event, such as a ringing event for causing the target DN 530 to ring, or a screen pop event for causing information related to the call to be made available to the agent, for example in the form of a screen pop. This event, like the agent reservation request, is to be routed to the T-controller which owns the agent device on which the screen pop is to appear. The T-controller may be the same T-controller as the T-controller 525 which owns the target DN 530: in one exemplary embodiment, for example, the agent device is an integrated device containing display features and telephony capabilities, and the agent device has a single DN. To route the screen pop event to the target device, the first session controller 510 executes the hash function, passing in the DN as an argument and receiving as output an identifier, e.g., a unique string, identifying the SIP server containing the T-controller 525 which owns the agent device. In this context, the agent device is another example of a resource. The first session controller 510 then dispatches the event to the T-controller 525, which forwards it to the agent device, causing the agent device to respond to the event, e.g., providing output to the agent by generating a ringing alert in response to a ringing event, or by displaying a screen pop in response to a screen pop event.

Figure 11:
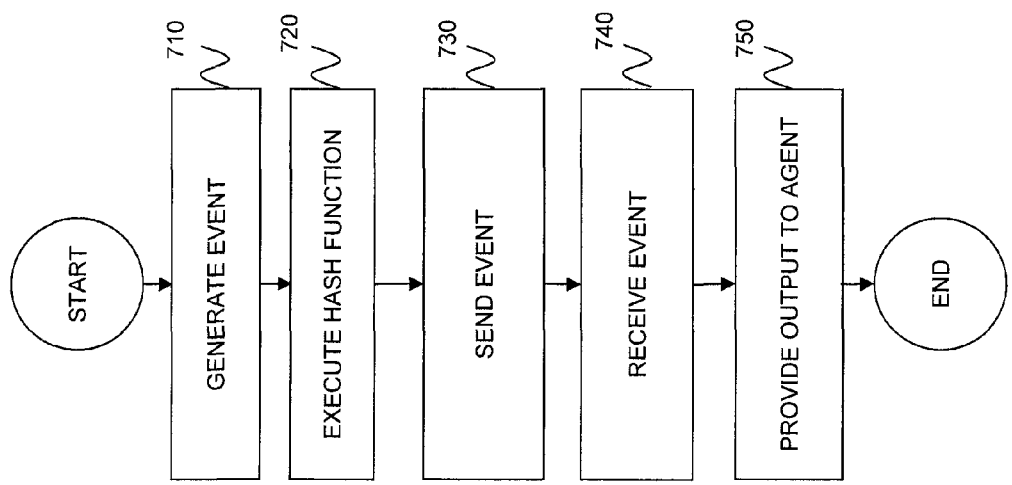
FIG. 11 is a flow chart showing acts involved in event delivery according to an exemplary embodiment of the present invention.

FIG. 11 is a flow diagram of a process for distributed event delivery according to one embodiment. In act 710, a computing device in which the first session controller 510 executes generates an event, and the computing device, again through the execution of the first session controller 510, identifies the SIP server to which the event is to be delivered, by, in act 720, executing a hash function. In act 730 the first session controller 510 sends the event to the T-controller in the SIP server to which the event is to be delivered, the T-controller receives the event, in act 740, and, in act 750, the agent device generates output, such as a ringing alert, or a screen pop, for the agent. Although the acts are described in a particular order in this example, the invention is not limited to acts occurring in this order, and some or all of the acts may take place in a different order, or in parallel.

IV. Analysis of Log Files in a Distributed System

The threads executing in various modules in the contact center may, in operation, generate records, which may be referred to as log files, of aspects of their operation. For example, a thread may record, or log, each message or event it sends to another thread, or receives from another thread. During operation, each thread writes to a separate log file. It may on occasion be advantageous to review or analyze such log files, to assess the performance of the contact center, or to diagnose unusual or erroneous activity. Log files may be large, however, and for any particular investigation, some of the information in a log file may be of little interest. Moreover, as modules interact, log entries related to these interactions may be recorded in different log files. A tool for systematically identifying, classifying, and displaying relevant information in log files may therefore be of use.

Figure 12:
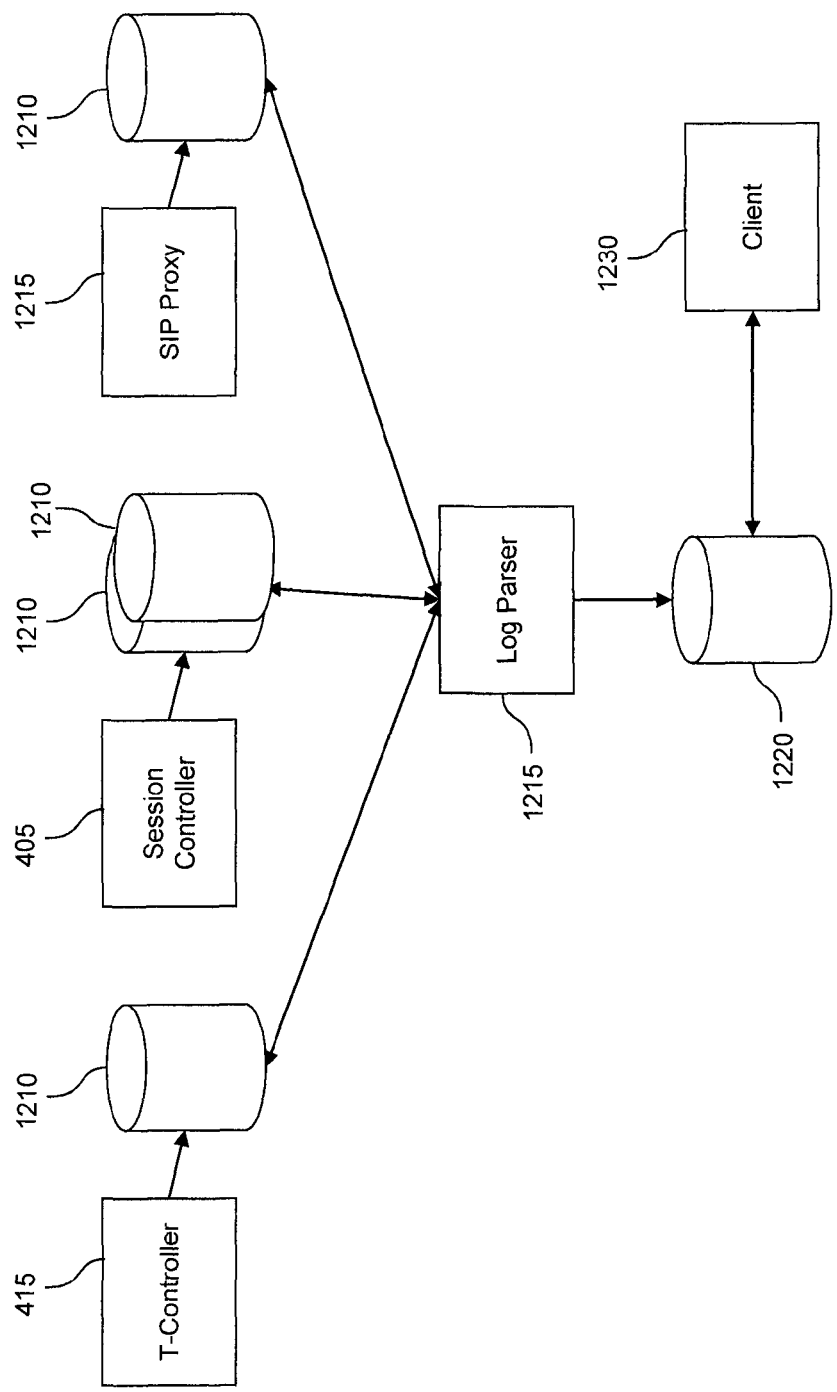
FIG. 12 is a block diagram showing modules and components involved in the generation and analysis of log files according to an exemplary embodiment of the present invention.

FIG. 12 is a block diagram of modules 415, 405, 1215 generating log files 1210, which are parsed by a log parser 1215 into a database 1220, queried by a client 1230 according to an exemplary embodiment. A log file analysis tool may operate in two stages, a first stage referred to as a parsing stage, and a second stage referred to as a query stage. These stages may subsequently be repeated. In one embodiment, one or more log files 1210 are written, during operation, by, e.g., a T-controller 415, a session controller 405, and a SIP proxy 1210. Log files may also be written by other types of module, including stat servers 322, routing servers 320, or ICONs 120. At the beginning of the analysis, the log files of interest are put into one directory, or folder, accessible from a computer. In the parsing stage, one or more of the log files are read by a log parser 1215, and their contents are written to tables in a database 1220. The database 1220 may contain a dedicated table for each thread. Certain fields, referred to as basic fields, may be present in each table in the database 1220; other fields may be present in some tables and may not have meaningful values for some threads. Examples of basic fields may include a time stamp for each log entry, the position of each log entry in the log file, and the file name of the log file.

Other basic fields may include, for T-Lib messages, the DN number and the connection ID, a unique identifier for the connection, and, for SIP messages, fields identified by names known to those of skill in the art as the following: Call-ID, CSeq, Message type, To URI, From URI, Via, RI (top most), Via branch, Request URI, Destination IP, Destination port, Source IP, and Source port.

In one exemplary embodiment, each thread is configured to record a log entry known as a trigger when it sends to another thread an event or message in response to which the receiving thread is expected to take some action. The trigger includes a unique identifier, which is sent as part of the message or event. The receiving thread then records, in its log file, a log entry known as a handler when it begins handling, e.g., responding to, the message or event, and another handler when it completes handling the message or event. Each handler log entry contains the same unique identifier present in the trigger log entry, and the two handlers provide starting and ending boundaries in the receiving thread's log file for log entries made while handling the message or event. The unique identifier present in a trigger or handler message is also a basic field in any database table for a thread which may record triggers or handlers.

For example, in an analysis session, the log files generated during a time interval may be collected in one directory. These log files may include files generated by a SIP server 318, e.g., one log file for each thread executing within the instance of SIP server, a log file for a routing server 320, a log file for a stat server 322, a log file for a SIP proxy 346, and a log file for a feature server 425. An analyst may wish to view activity involving a particular thread, such as a thread named TServer which executes in the session controller 405, which in turn is part of the SIP server process. The analyst may run the log parser, selecting the log file corresponding to the TServer thread, and the log parser may be configured to transcribe each entry into the database, parsing each entry to extract fields of interest, such as the basic fields, and other fields identified by the parser for this type of log file.

In a stage of querying the database using a client which may be referred to as a front end, the analyst may then, for example, perform a query requesting transactions related to a particular calling phone number, e.g., a phone number for which a connection problem was reported. The front end may include a user interface, suitable for receiving input, such as mouse clicks, from the user, and for displaying results to the user. The query may reveal that a call from this number was received by the TServer thread, but the call was not answered, e.g., the call triggered a transaction at the SIP server layer but no result was triggered.

The session controller 405 may contain two threads, a TServer thread and a call manager thread, and the latter may be responsible for SIP messaging. To further investigate the cause of the unanswered call, the analyst may invoke the log parser to parse the call manager thread's log file, and perform queries, to display both T-Lib messages and SIP messages, from both threads, in, for example, chronological order. A user interface module may display the results of each query in a user-readable format. Because the log file name and the position in the log file of each log entry are basic fields in each table in the database 1220, the user interface may provide to the user the ability, by clicking on a data item displayed in the user interface, to open the log file from which this data item was originally retrieved, and to highlight the corresponding log entry in the log file. Using the log file name and the position in the log file of each log entry, the query may also display, e.g., in a separate adjacent pane or window next to the query results, the log file entries from which these query results originated, and each such log file entry may be clickable, e.g., clicking on it may cause a viewer to open, allowing the user to see the entire contents of the log file containing the entry, e.g., with the entry highlighted. For example, in the adjacent pane or window, the front end may display a series of log file entries in chronological order, showing, e.g., the log file entry corresponding to the sending of a message from one module, followed by the log file entry, from a different log file, corresponding to the receipt of the message by another module, and followed by log file messages corresponding to acts executed by the second module in handling the message.

Figure 13:
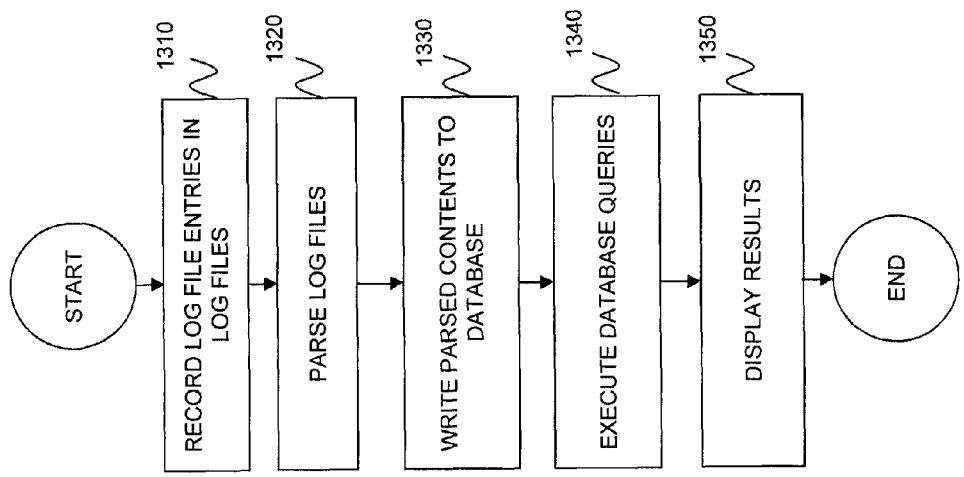
FIG. 13 is a flow chart showing acts involved in the generation and analysis of log files according to an exemplary embodiment of the present invention.

FIG. 13 is a flow chart illustrating acts involved in log file analysis, according to an exemplary embodiment. In act 1310, log files are written by each thread in the system. In act 1320, a subset of the log files is parsed by the log parser. In an act 1330, the log parser writes the value of each field of interest in each log file entry into a corresponding field in a corresponding table in a database. In an act 1340, the front end executes user-selected or user-generated database queries, and, in an act 1350, the user interface displays the results. Although the acts are described in a particular order in this example, the invention is not limited to acts occurring in this order, and some or all of the acts may take place in a different order, or in parallel.

V. Dial Plan for Outgoing Calls

Figure 14:
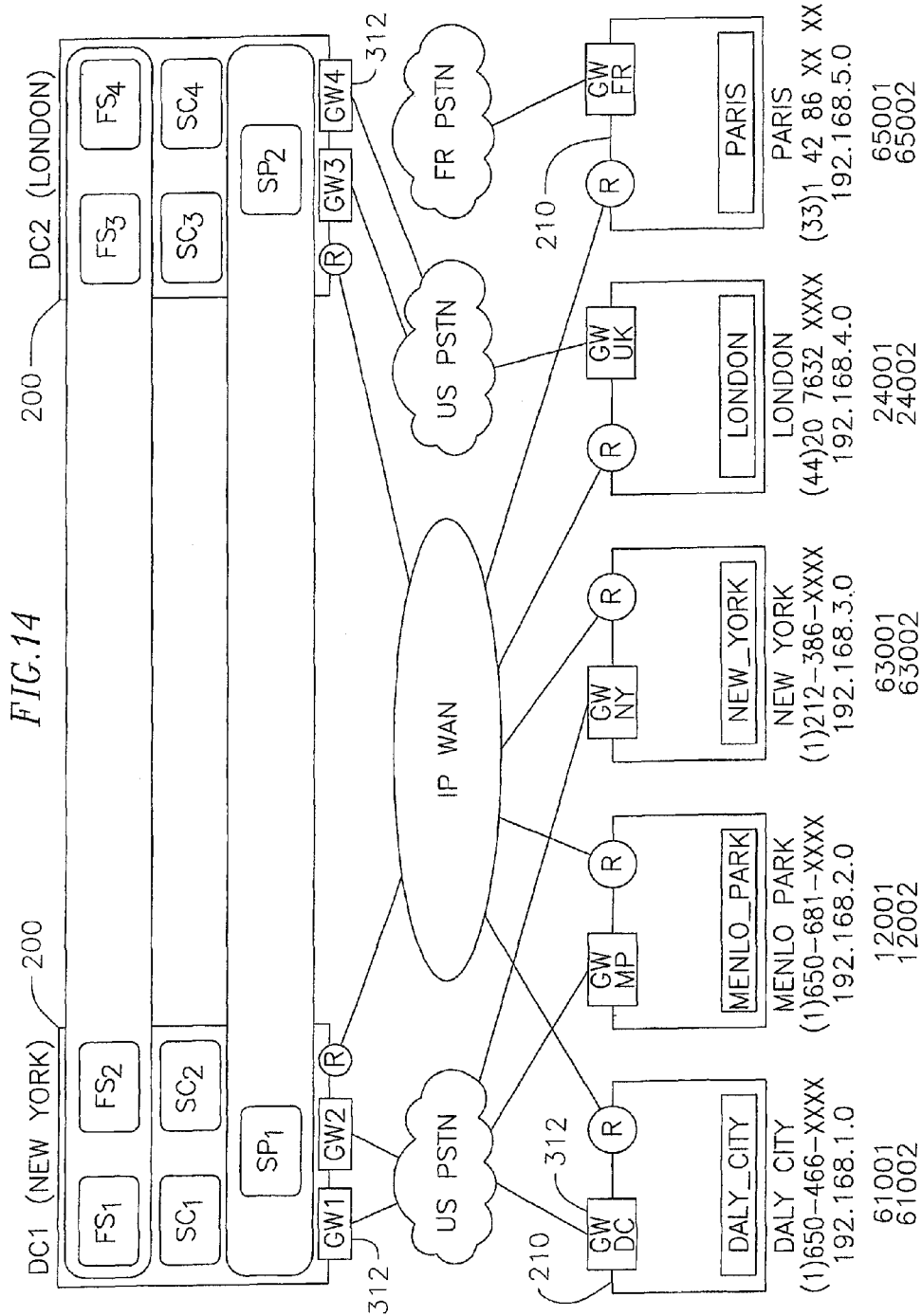
FIG. 14 is a schematic diagram of data centers and agent sites connected by multiple networks according to an exemplary embodiment of the present invention.

On occasion a need may arise for an agent to make an outbound call from an agent device, e.g., to another agent in the contact center or to a customer who has asked to be called back. In such a case a dial plan may be provided by the feature server 425 (FIG. 4) to support the process of connecting the call. FIG. 14 shows a schematic diagram of an exemplary geographically distributed contact center, which may include two data centers 200, one in New York, and one in London, and it may include five agent sites 210, located in Daly City, Menlo Park, N.Y., London, and Paris.

Figure 15:
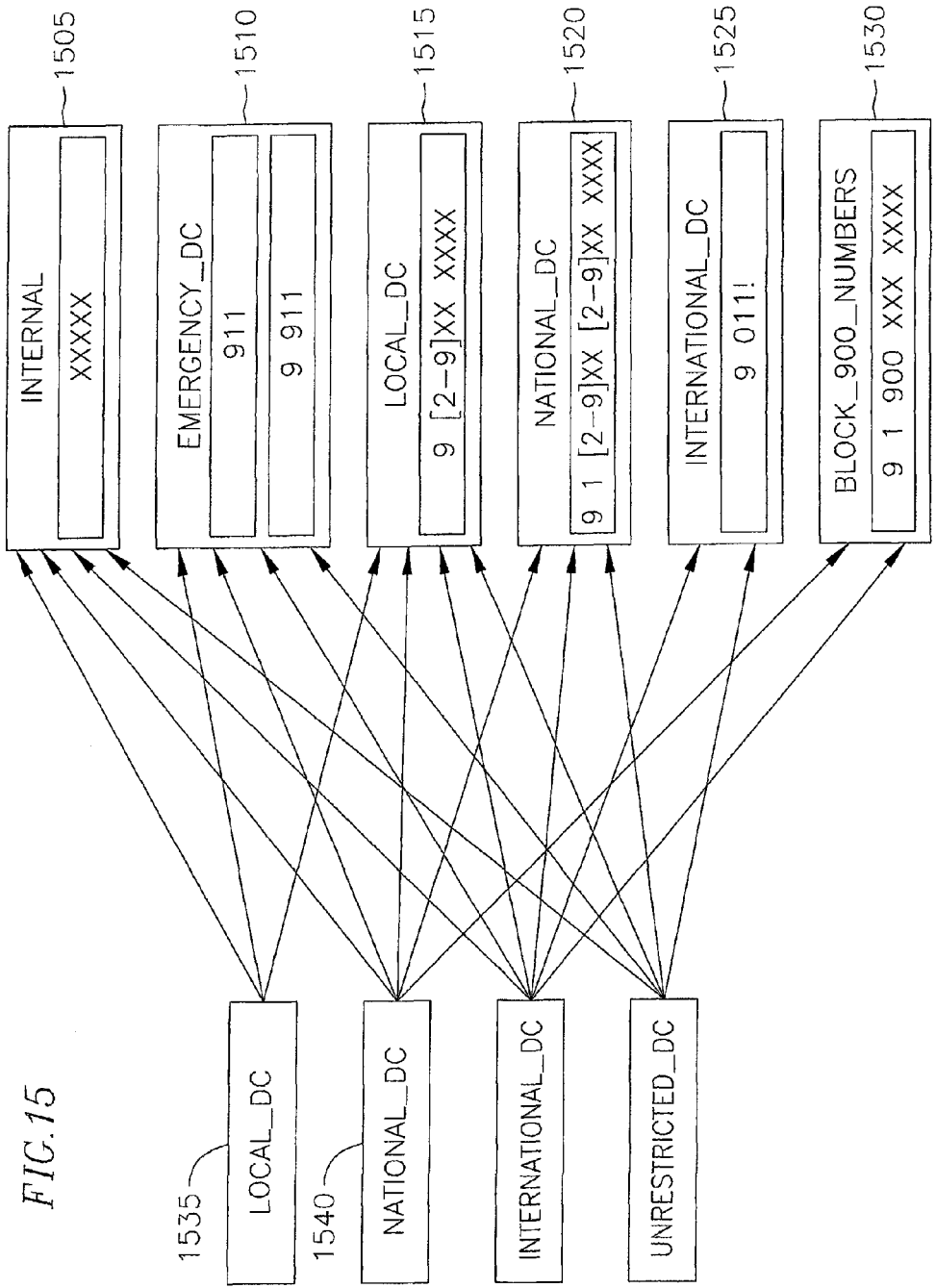
FIG. 15 is a schematic diagram of calling profiles and call categories according to an exemplary embodiment of the present invention.

FIG. 15 illustrates calling profiles, categories, and patterns, which may be used to implement a dial plan in one exemplary embodiment. An agent may dial a sequence of digits referred to as a dialed string, and the feature server 425 may classify it according to a set of categories, each of which may contain one or more patterns. For example, a first category 1505 may include internal numbers, e.g., numbers corresponding to endpoints within the contact center, which may be five-digit extension numbers represented in a symbolic pattern-matching notation as "XXXXX", where the symbol "X" denotes a position in the dialed string for which any digit constitutes a match. A second category 1510 may include emergency numbers, represented by the two patterns "9 911" and "911". A third category 1515 may include local external numbers, a fourth category 1520 may include external domestic numbers, a fifth category 1525 may include external international numbers, and a sixth category 1530 may include blocked numbers. Blocked numbers may include, for example, numbers with a "900" area code, for which additional charges may be levied on the calling party.

Each agent device from which outbound calls can be made may be configured with one or more calling profiles, each of which is a list of available categories, e.g., categories available for matching. Each category may contain a set of patterns. The calling profile may be used to limit the ability of the agent device to place outgoing calls. When a sequence of digits is dialed at an agent device, the sequence, e.g., the dialed string, may be tested against each pattern in each category included in the profile (e.g., each available category) to determine whether the dialed string matches any pattern in the category. If the dialed string does not match any pattern in a category in the calling profile, or if it matches any pattern in a blocked category, the call will be denied, and the agent device may generate an error tone to indicate that the call has been denied.

For example, a first calling profile 1535, which may be referred to as a local calling profile, may include the first category 1505, the second category 1510, and the third category 1515. Any call attempted from an agent device configured with the first calling profile will be denied unless the dialed string matches a pattern in the first category, the second category, or the third category, e.g., unless the call is an internal call, a call to an emergency number, or a call to a local external number. In this case the inclusion or exclusion of the sixth category, containing a pattern for blocked "900" numbers, may have no effect because a number beginning with "9-1-900" and followed by 7 other digits will in any event not match any of the patterns in the categories in the calling profile. A second calling profile 1540 may contain the first category 1505, the second category 1510, the third category 1515, the fourth category 1520, and the sixth category 1530, so that an agent device configured with the second calling profile 1540 may be able to initiate calls to internal numbers, emergency numbers, local external numbers, and domestic external numbers. International calls may not be possible because an attempt to dial an international number may result in a dialed string not matching any pattern in a category associated with the calling profile, and an attempt to dial a "900" number may fail as a result of it matching the blocked sixth category 1530. Calling profile definitions may be different for different agent sites 210, so that, for example, the definition of a local calling profile in a Daly City agent site 210 may be different from the definition of a local calling profile in a Menlo Park agent site 210. The definitions of categories may similarly be different for different agent sites 210.

If the dialed string matches more than one category, then a rank, which may be referred to as a weight, may be used to identify the category and pattern which is the best match for the dialed string. In one exemplary embodiment the weight is calculated as follows. First, a maximum dialed string length, which is at least the length of the longest anticipated dialed string, is selected. The weight is initially set to this maximum dialed string length multiplied by 10. Then, for each digit element in a pattern, the weight is decreased by the number of digits, out of a possible 10 (ranging from "0" to "9") that will match that digit element. Here, a digit element is an element of a pattern corresponding to one digit of a dialed string; the element matches a range of possible values for that digit. For example, in one notation the character "X" matches any digit, "Z" matches any digit except "0", and a range may be specified in brackets, so that "[2-9]" matches any digit between "2" and "9". Using this algorithm and a maximum dialed string length of 100, a pattern such as "9[2-9]XX XXXX" has an initial weight of 1000 (e.g., 100×10), which is then decreased by 1 (for the initial "9" which matches one digit), then by 8 (for the digit element "[2-9]" which matches eight possible digits), and then by 60 (for the six "X" digit elements, each of which matches ten possible digits), resulting in a weight of 931. In one notation the character "*" may match any number of digits having any value, so that for example "9*" matches any dialed string beginning with the digit "9". The weight of this pattern may be calculated assuming the dialed string has the maximum length, so that for a maximum dialed string length of 100, the weight is 9. In this case the weight is calculated from an initial weight of 1000 (e.g., 100×10), decreased by 1 (for the initial character "9") and decreased by 990 (for the remaining 99 "*" characters, each of which matches 10 possible digits). Although a specific example of an algorithm for calculating a weight for a pattern is described here, the invention is not limited thereto, and other algorithms may be used to determine the weight of a pattern. In one embodiment, the weight of a pattern may be determined using an algorithm which takes as input both the pattern and the dialed string.

Once the dialed string has been matched to one or more category and the best match category has been identified, e.g., the category with the highest weight, or any blocking category, the dialed string is translated into a translated string, which may include both routing information and an endpoint identifier. For example if the dialed string is a domestic external number, the call may be routed part way to its destination within an interne protocol (IP) network, through a gateway 312 to the PSTN network, and from there to the destination number. The PSTN carrier may charge for the use of the PSTN network, and the amount charged, e.g., the cost to the contact center operator, may depend on multiple factors, including the time of day, the day of the week, and the location of the gateway and of the destination number. Different gateways 312 may be serviced by different PSTN carriers, and several PSTN carriers may be available at a gateway 312. The time of day, which may affect the cost of the call, may depend on the time zone in which the gateway is located.

In one exemplary embodiment, the feature server 425 (FIG. 4) maintains state information on a set of gateways 312, including, for example, whether the gateway 312 is operational and its reserve capacity. When translating a dialed string with an endpoint external to the contact center, the feature server 425 first identifies available gateways 312, e.g., those that are operational and have the capacity to handle an additional call, and it then calculates the estimated cost of using each available gateway to route the call, taking into account the carriers available at the gateway, the time of day, the day of the week, the time zone in which the gateway 312 is, and any other factors, such as the distance from the gateway 312 to the location of the destination number. The feature server 425 then selects the lowest-cost option, and translates the number accordingly.

The output of the translation process may be a string referred to as a translated number which may include an identifier for the destination number, e.g., an E.164 number, and other characters identifying the routing to the PSTN. For example, if the feature server 425 determines that the call is best routed through a New York gateway identified by the string "NY1" it may form, from a dialed string such as "212 555 1234", the translated number "NY1 212 555 1234".

Although exemplary embodiments of a SIP cluster have been specifically described and illustrated herein, many modifications and variations will be apparent to those skilled in the art. Accordingly, it is to be understood that SIP cluster constructed according to principles of this invention may be embodied other than as specifically described herein. For example, the present invention need not be limited to use in a contact center; it may provide benefits in other applications such as enterprise communications systems used for other purposes. The invention is also defined in the following claims, and equivalents thereof.

What is claimed is:

1. A method for distributed event delivery, comprising:
generating, by a first module executing on a first computing device, an event for a contact center resource device,
identifying, by the first module, a resource identifier (ID) for the contact center resource device;
identifying, by the first module, a second module responsible for the contact center resource device, wherein the identifying comprises:
providing the resource ID to a function called by the first module;
receiving as an output, from the function, a module identifier (ID) for the second module; and
sending, by the first module, the event to the second module based on the identified module ID for forwarding the event to the contact center resource device.

2. The method of claim 1 further comprising:
forwarding the event to a resource identified by the resource ID, wherein the resource generates an output in response to the event.

3. The method of claim 2, wherein the event is a ringing event.

4. The method of claim 3, comprising:
receiving, by the resource, the ringing event; and
generating, by the resource, a ringing alert.

5. The method of claim 2, comprising routing a call to an agent device associated with the resource ID.

6. The method of claim 2, wherein the event is a screen pop event.

7. The method of claim 6, comprising:
receiving, by the resource, the screen pop event; and
generating, by the resource, a screen pop.

8. The method of claim 1, wherein the function is a hash function.

9. The method of claim 8, wherein the hash function is a consistent hash function.

10. The method of claim 9, wherein the hash function comprises:
a first basic hash function configured to map resource identifiers into a range; and
a second basic hash function configured to map module identifiers into the range.

11. The method of claim 10, wherein the second basic hash function is further configured to map a replica of each module identifier into the range.

12. The method of claim 8, wherein the hash function is configured to map resource identifiers corresponding to resources in a geographic region into module identifiers corresponding to modules executing on computing devices in the geographic region.

13. The method of claim 1, wherein the second module executes on a second computing device.

14. The method of claim 13, wherein the second computing device is the same computing device as the first computing device.

15. A system for distributed event delivery, the system comprising:
a first computing device; and
a first memory hosting a first module,
wherein the first memory has stored thereon instructions that, when executed by the first computing device, cause the first computing device to:
generate an event for a contact center resource device;

identify a resource identifier (ID) for the contact center resource device;

identify a second module responsible for the contact center resource device, the second module being configured to execute on a second computing device, wherein the instructions further include instructions that cause the first computing device to:

provide the resource ID to a function called by the first module;

receive as an output, from the function, a module identifier (ID) for the second module; and send the event to the second module based on the identified module ID for forwarding the event to the contact center resource device.

16. The system of claim 15, wherein the function is a hash function.

17. The system of claim 16, wherein the hash function is a consistent hash function.

18. The system of claim 17, wherein the hash function comprises:

a first basic hash function configured to map resource identifiers into a range; and a second basic hash function configured to map module identifiers into the range.

19. The system of claim 18, wherein the second basic hash function is further configured to map a replica of each module identifier into the range.

20. The system of claim 15, wherein the second computing device is the same computing device as the first computing device.

* * * * *